J. WING.
Processes of Forming Orifices and Necks in Glass Articles.

No. 143,863.        Patented Oct. 21, 1873.

Witnesses:
Geo Gray
F. C. Hale.

Joseph Wing.
by his attorney
F. P. Hale.

UNITED STATES PATENT OFFICE.

JOSEPH WING, OF BOSTON, ASSIGNOR TO NEW ENGLAND GLASS COMPANY, OF EAST CAMBRIDGE, MASSACHUSETTS.

IMPROVEMENT IN PROCESSES OF FORMING ORIFICES AND NECKS ON GLASS ARTICLES.

Specification forming part of Letters Patent No. 143,863, dated October 21, 1873; application filed August 6, 1873.

*To all whom it may concern:*

Be it known that I, JOSEPH WING, of Boston, in the county of Suffolk and State of Massachusetts, have invented a new and useful Improvement in Forming Glass Lamp-Fountains; and do hereby declare the same to be fully described in the following specification and illustrated in the accompanying drawing, in which—

Figure 1:
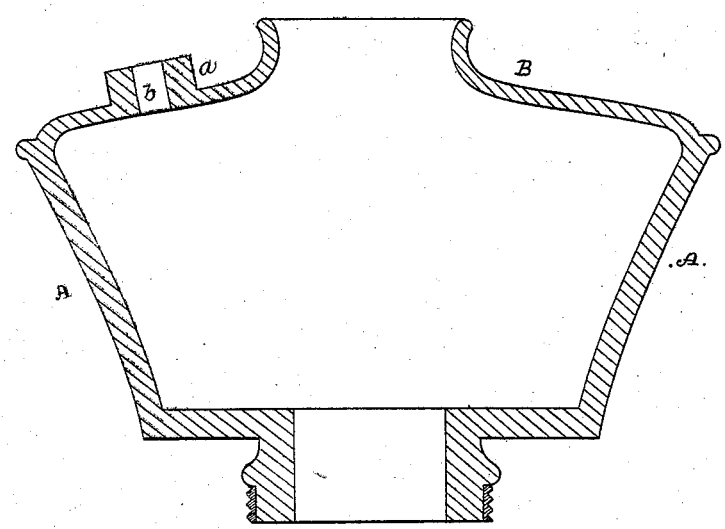
Figure 2:
Figure 3:
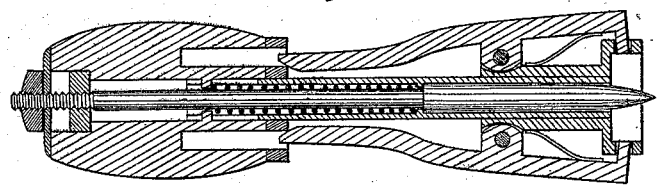

Figure 1 denotes a central and vertical section of a glass lamp-fountain constructed in accordance with my invention. Fig. 2 is a view of the grooved or chambered neck. Fig. 3 is a central and vertical section of a tool or apparatus for forming the neck and filling-orifice.

The object of my invention is to provide a simple and effective means of forming the filling neck and orifice of glass lamp-fountains, &c., whereby not only is less skill required and a great saving in time effected, but a more perfect uniformity in size is attained than by the method heretofore adopted; and my invention consists in the peculiar method of effecting this result, as hereinafter fully set forth and claimed.

In carrying out my invention I first press or form the lower portion or body A of the fountain in a mold, and with a cylindrical extension of a sufficient size, when reheated, manipulated, and drawn down, to form the top B. These parts having been pressed or molded in the ordinary manner, the portion to form the top B is to be reheated and drawn down to form the dome or top of the fountain; but, instead of drawing in and forming two orifices with necks thereto, as is usual in lamps of this character, I construct the top with but a single central neck and opening. The body and top of the fountain having been thus formed, I next apply to any part of the top where it may be desirable to locate the filling-neck *a* and orifice *b* a small quantity of molten glass, sufficient to form the said neck, and immediately apply thereto a press or mold provided with a sliding plunger of the character as shown in Fig. 3, the mold giving the desired external form, while the hot superimposed portion of the glass so softens the portion of the top immediately underlying the same as to enable the pointed plunger, when forced downward, to puncture the superimposed and underlying portions, and form an opening into the interior of the fountain of the desired size. This press is also provided with a pair of sliding arms, by which grooves or channels *c c* are formed on opposite sides of the neck, as shown in Fig. 2, such channels being for the reception of plaster-of-paris or other cement suitable to fix the metal cap to the neck.

My invention is not restricted to the formation of necks and openings for glass lamp-fountains, as it is equally available in forming tubular necks to communicate with the interior of various glass articles.

Having described my invention, what I claim is—

The above-described process of forming the filling necks and orifices on glass lamp-fountains, &c., the same consisting in superimposing at the desired point of the fountain, when formed, a quantity of molten glass, sufficient to form the neck, and subsequently treating the superimposed and the underlying portions in manner as stated.

JOSEPH WING.

Witnesses:
F. P. HALE,
F. C. HALE.